United States Patent
Mutnuru

(10) Patent No.: US 10,033,805 B1
(45) Date of Patent: Jul. 24, 2018

(54) SPANNING TREE APPROACH FOR GLOBAL LOAD BALANCING

(71) Applicant: Juniper Networks, Inc., Sunnyvale, CA (US)

(72) Inventor: Rishi K. Mutnuru, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 110 days.

(21) Appl. No.: 15/067,592

(22) Filed: Mar. 11, 2016

(51) Int. Cl.
  *H04L 29/08* (2006.01)
  *H04L 29/12* (2006.01)

(52) U.S. Cl.
  CPC ........ *H04L 67/1036* (2013.01); *H04L 61/103* (2013.01); *H04L 61/20* (2013.01); *H04L 67/1002* (2013.01)

(58) Field of Classification Search
  CPC ............. H04L 67/1036; H04L 67/1002; H04L 61/103; H04L 61/20
  See application file for complete search history.

(56) References Cited

U.S. PATENT DOCUMENTS

| | | | |
|---|---|---|---|
| 6,788,681 B1 | 9/2004 | Hurren et al. | |
| 7,634,230 B2 | 12/2009 | Ji et al. | |
| 7,881,208 B1 | 2/2011 | Nosella et al. | |
| 8,327,017 B1 * | 12/2012 | Trost | H04L 67/1031 370/220 |
| 8,521,879 B1 * | 8/2013 | Pena | H04L 67/1036 709/226 |
| 8,824,286 B2 | 9/2014 | Lee et al. | |
| 2012/0327766 A1 * | 12/2012 | Tsai | H04L 45/46 370/230 |
| 2014/0258739 A1 * | 9/2014 | Gunasekara | H04L 43/0817 713/300 |

OTHER PUBLICATIONS

Wikipedia, "Spanning Tree Protocol," https://en.wikipedia.org/wiki/Spanning_Tree_Protocol, Feb. 19, 2016, 13 pages.
Wikipedia, "Network topology," https://en.wikipedia.org/wiki/Network_topology, Feb. 29, 2016, 10 pages.

* cited by examiner

*Primary Examiner* — Jianye Wu
(74) *Attorney, Agent, or Firm* — Harrity & Harrity, LLP

(57) ABSTRACT

A device may receive first data center information associated with first data centers in a first region. The device may receive second data center information associated with second data centers in a second region that is different from the first region. The device may generate a spanning tree based on the first data center information and the second data center information. The spanning tree may be associated with exchanging metrics associated with the first data centers and the second data centers, and may be used to exchange the metrics between the device and other devices included in the first data centers or the second data centers. The device may exchange the metrics with the other devices based on the spanning tree.

20 Claims, 8 Drawing Sheets

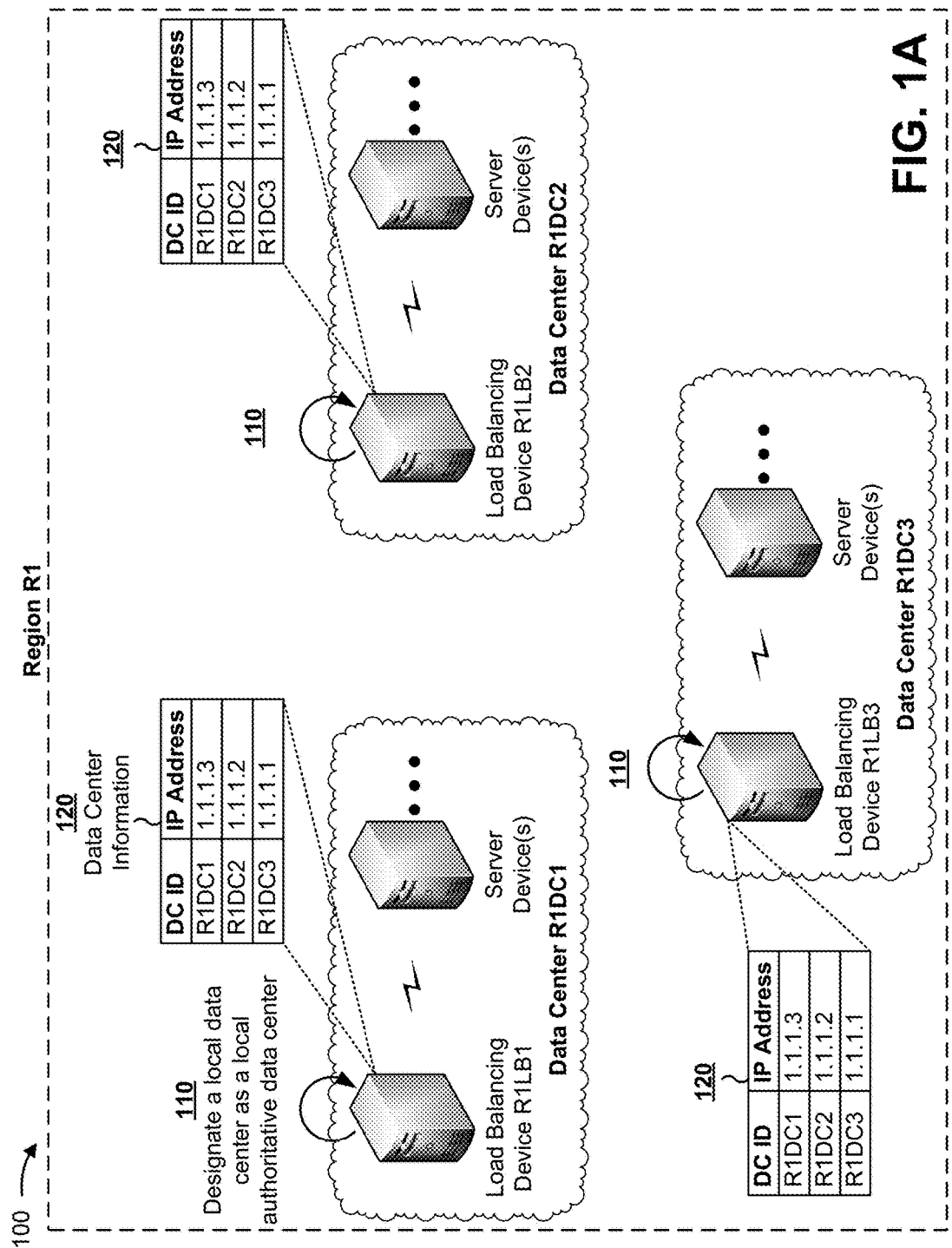

SPANNING TREE APPROACH FOR GLOBAL LOAD BALANCING

BACKGROUND

A load balancing device may perform load balancing for one or more server devices. When performing the load balancing, the load balancing device may distribute workloads, such as domain name system (DNS) requests, across computing resources, such as computers, a computer cluster, network links, central processing units (CPUs), or disk drives. To distribute the workloads across the computing resources, the load balancing device may use a load balancing technique, such as round-robin DNS or client-side random load balancing.

SUMMARY

According to some possible implementations, a load balancing device may include one or more processors to receive first information associated with a plurality of local data centers included in a local region with the load balancing device. The one or more processors may receive second information associated with a plurality of remote data centers included in a plurality of remote regions separate from the local region. The one or more processors may generate a spanning tree based on the first information and the second information. The spanning tree may indicate a manner in which the load balancing device and a plurality of other load balancing devices are to communicate to exchange third information associated with the plurality of local data centers and the plurality of remote data centers. The spanning tree may indicate that a first load balancing device is to exchange the third information with a second load balancing device. The one or more processors may exchange the third information with one or more remote load balancing devices, included in one or more remote data centers of the plurality of remote data centers, based on the spanning tree.

According to some possible implementations, a non-transitory computer-readable medium may store one or more instructions that, when executed by one or more processors, cause the one or more processors to receive local data center information associated with multiple local data centers. The multiple local data centers may be located in a local geographic area, and the multiple local data centers may include multiple local load balancing devices. The one or more instructions may cause the one or more processors to receive remote data center information associated with multiple remote data centers. The multiple remote data centers may be located in a remote geographic area that is different from the local geographic area, and the multiple remote data centers may include multiple remote load balancing devices. The one or more instructions may cause the one or more processors to generate a spanning tree based on the local data center information and the remote data center information. The spanning tree may indicate a manner in which a local authoritative load balancing device, of the multiple local load balancing devices, and multiple other load balancing devices, of the multiple local load balancing devices or the multiple remote load balancing devices, are to exchange metrics associated with the multiple local data centers or the multiple remote data centers. The spanning tree may include information to be used by the local authoritative load balancing device to exchange the metrics with the multiple other load balancing devices. The one or more instructions may cause the one or more processors to exchange the metrics with the multiple other load balancing devices based on the spanning tree.

According to some possible implementations, a method may include receiving, by a device, first data center information. The first data center information may be associated with first data centers in a first region. The method may include receiving, by the device, second data center information. The second data center information may be associated with second data centers in a second region. The first region and the second region may be different. The method may include generating, by the device, a spanning tree based on the first data center information and the second data center information. The spanning tree may be associated with exchanging metrics associated with the first data centers and the second data centers. The spanning tree may be used to exchange the metrics between the device and other devices included in the first data centers or the second data centers. The method may include exchanging, by the device, the metrics with the other devices based on the spanning tree.

BRIEF DESCRIPTION OF THE DRAWINGS

FIGS. 1A-1D are diagrams of an overview of an example implementation described herein;

DETAILED DESCRIPTION

Figure 1B:
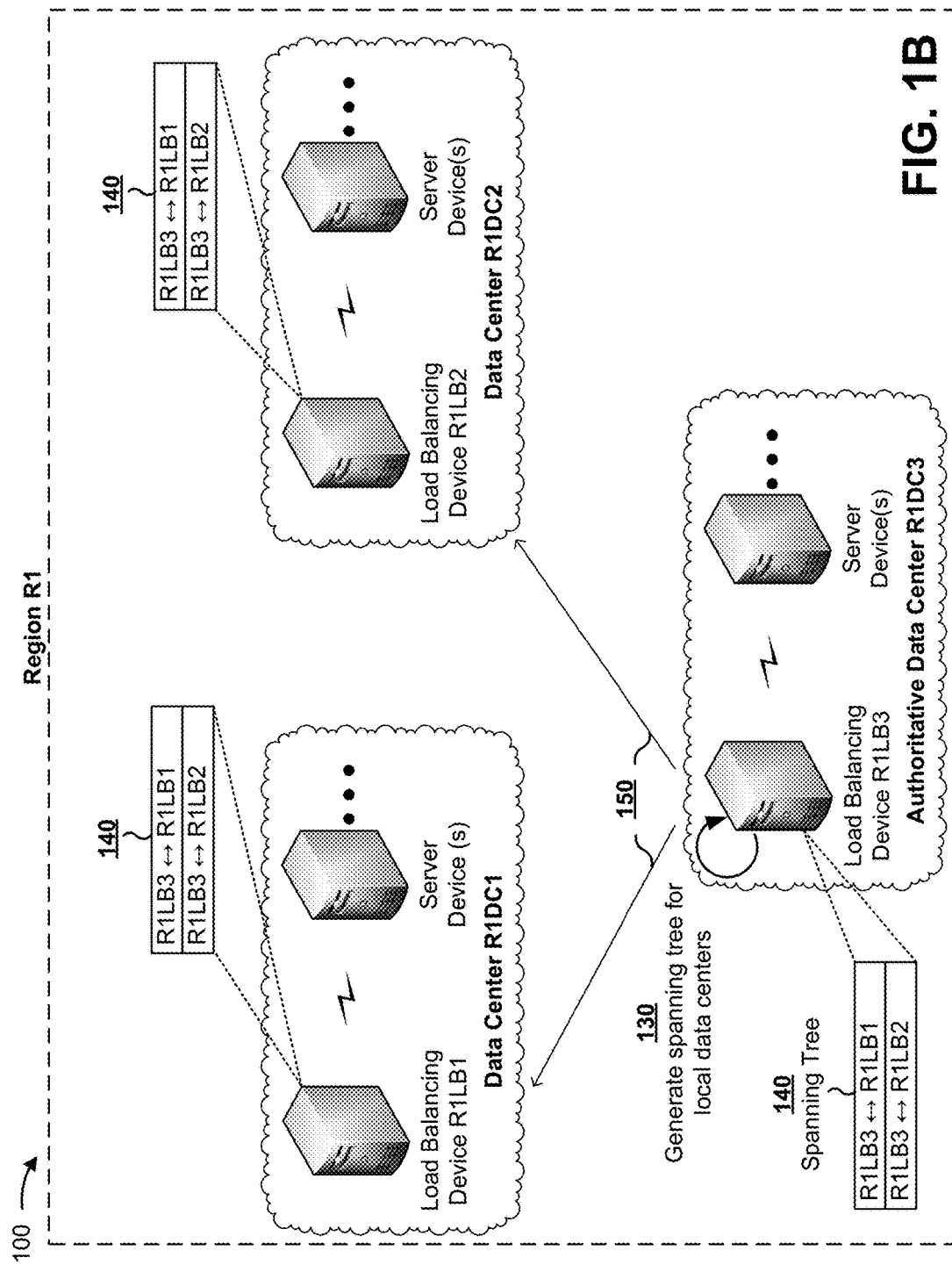

The following detailed description of example implementations refers to the accompanying drawings. The same reference numbers in different drawings may identify the same or similar elements.

Load balancing devices, which may be associated with data centers, may perform load balancing, where workloads (e.g., domain name system (DNS) requests or other types of requests for resources) are balanced across the data centers (e.g., groups of servers). To balance the workloads across the data centers, the load balancing devices may exchange metrics associated with the workloads of the data centers (e.g., a quantity of requests per second for a data center, memory usage of the data center, or available computing resources of the data center).

One technique for exchanging the metrics may include using a mesh network, such as a fully connected mesh network, where all load balancing devices connected to a network (e.g., a wide area network (WAN)) exchange the metrics with all other load balancing devices on the same network. This technique may be resource intensive because having all load balancing devices exchange the metrics with all other load balancing devices may consume significant computing resources and/or network resources. In addition, this technique may impose scaling limits when adding load balancing devices to the network because for each additional load balancing device connected to the network, the number of connections among the load balancing devices increases by L−1 (where L is the number of load balancing devices connected to the network after adding a load balancing device).

Implementations described herein enable a load balancing device to exchange metrics with other load balancing devices using a spanning tree. This may reduce and/or eliminate the need for all load balancing devices in a region to exchange metrics with all other load balancing devices in the region, which conserves network resources by permitting fewer transmissions of the metrics in the region (e.g., relative to exchanging metrics via a mesh network). This may also reduce scaling limits when adding load balancing devices to the network by reducing and/or eliminating the need for all load balancing devices to exchange metrics with all other load balancing devices connected to the network, thereby reducing the number of metric exchanges. In addition, implementations described herein enable an authoritative load balancing device for a region to exchange region metrics with other authoritative load balancing devices for other regions (e.g., rather than having all load balancing devices in the region exchange metrics with all load balancing devices in the other regions). This conserves network resources by permitting fewer transmissions of metrics among different regions.

FIGS. 1A-1D are diagrams of an overview of an example implementation 100 described herein. As used herein, the terms "local" and "remote" may be used to refer to particular regions, data centers, and/or load balancing devices. The term "local" may be used to describe a first region and/or first devices in the first region, when describing implementations from the perspective of the first devices or the first region. The term "remote" may be used to describe a second region, different from (e.g., external to) the first region, and/or to describe second devices in the second region.

As shown in FIG. 1A, a region, such as region R1 (e.g., a local region), may include multiple data centers (e.g., local data centers, shown as "R1DC1," "R1DC2," and "R1DC3"). A data center may include a load balancing device and multiple server devices. As further shown in FIG. 1A, and by reference number 110, the load balancing devices may designate one of the local data centers as a local authoritative data center. The load balancing device associated with the local authoritative data center (e.g., a local authoritative load balancing device) may manage load balancing within region R1 and among other regions (e.g., remote regions), as described below.

As shown by reference number 120, the load balancing devices may use data center information, such as data center identifiers ("DC ID"), identifying data centers in region R1 and Internet protocol (IP) addresses, corresponding to the data centers, to determine the local authoritative data center. For example, data center R1DC1 may have an IP address of 1.1.1.3, data center R1DC2 may have an IP address of 1.1.1.2, and data center R1DC3 may have an IP address of 1.1.1.1, as shown. In some implementations, the load balancing devices may determine the local authoritative data center for region R1 by, for example, determining the local data center with the lowest IP address relative to other local data centers. In this case, the load balancing devices may determine that local data center R1DC3 has the lowest IP address relative to local data centers R1DC1 and R1DC2. Thus, the load balancing devices may designate local data center R1DC3 as the local authoritative data center for region R1.

As shown in FIG. 1B, and by reference number 130, load balancing device R1LB3 (e.g., the local authoritative load balancing device) may generate a spanning tree for the local data centers in region R1. As shown by reference number 140, the authoritative load balancing device may store the spanning tree, or information including the spanning tree (e.g., as shown by "R1LB3↔R1LB1" and "R1LB3↔R1LB2"), which load balancing device R1LB3 may use to exchange metrics with load balancing devices R1LB1 and R1LB2.

As shown by reference number 150, load balancing device R1LB3 may provide, for storing, the spanning tree to load balancing devices R1LB1 and R1LB2, which load balancing devices R1LB1 and R1LB2 may use to exchange metrics with load balancing device R1LB3. In some implementations, the authoritative load balancing device may provide a portion of the spanning tree to particular load balancing devices (e.g., rather than providing the entire spanning tree), which conserves network resources by providing a portion of the spanning tree and conserves memory resources of the load balancing devices by storing a portion of the spanning tree.

Figure 1C:
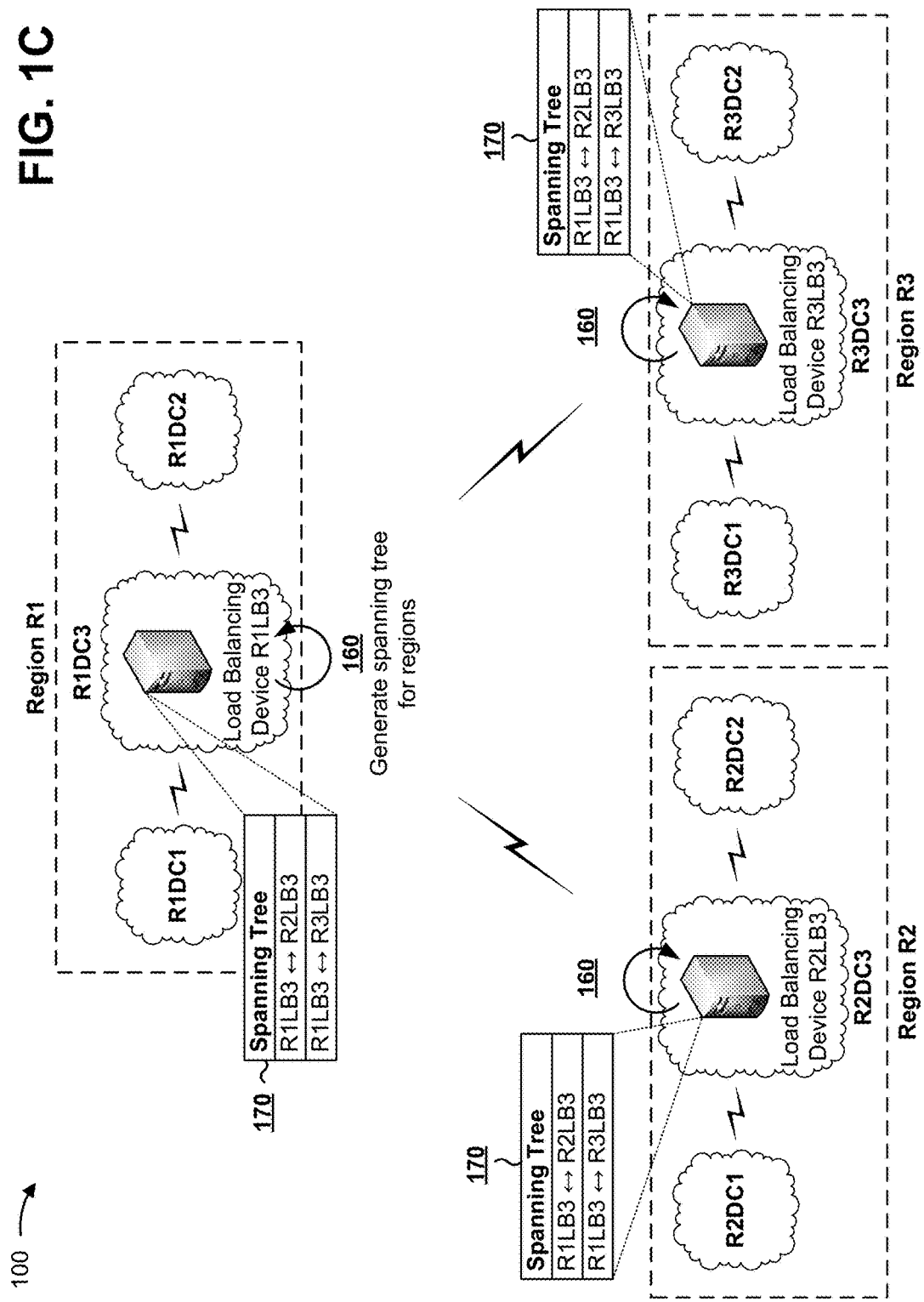

As shown in FIG. 1C, and by reference number 160, local authoritative load balancing device R1LB3 and remote authoritative load balancing devices (e.g., load balancing devices R2LB3 and R3LB3) in remote regions may generate a spanning tree for regions R1, R2, and R3 (e.g., for authoritative load balancing devices R1LB3, R2LB3, and R3LB3). As shown by reference number 170, the authoritative load balancing devices may store the spanning tree, or information including the spanning tree (e.g., as shown by "R1LB3↔R2LB3" and "R1LB3↔R3LB3"). In some implementations, a particular authoritative load balancing device may store a portion of the spanning tree (e.g., rather than storing the entire spanning tree), such as the portion that includes the authoritative load balancing devices with which the particular authoritative load balancing device is to exchange metrics, which conserves memory resources of the authoritative load balancing devices by storing a portion of the spanning tree. The authoritative load balancing devices may use the spanning tree to exchange metrics among regions R1, R2, and R3, as described below.

Figure 1D:
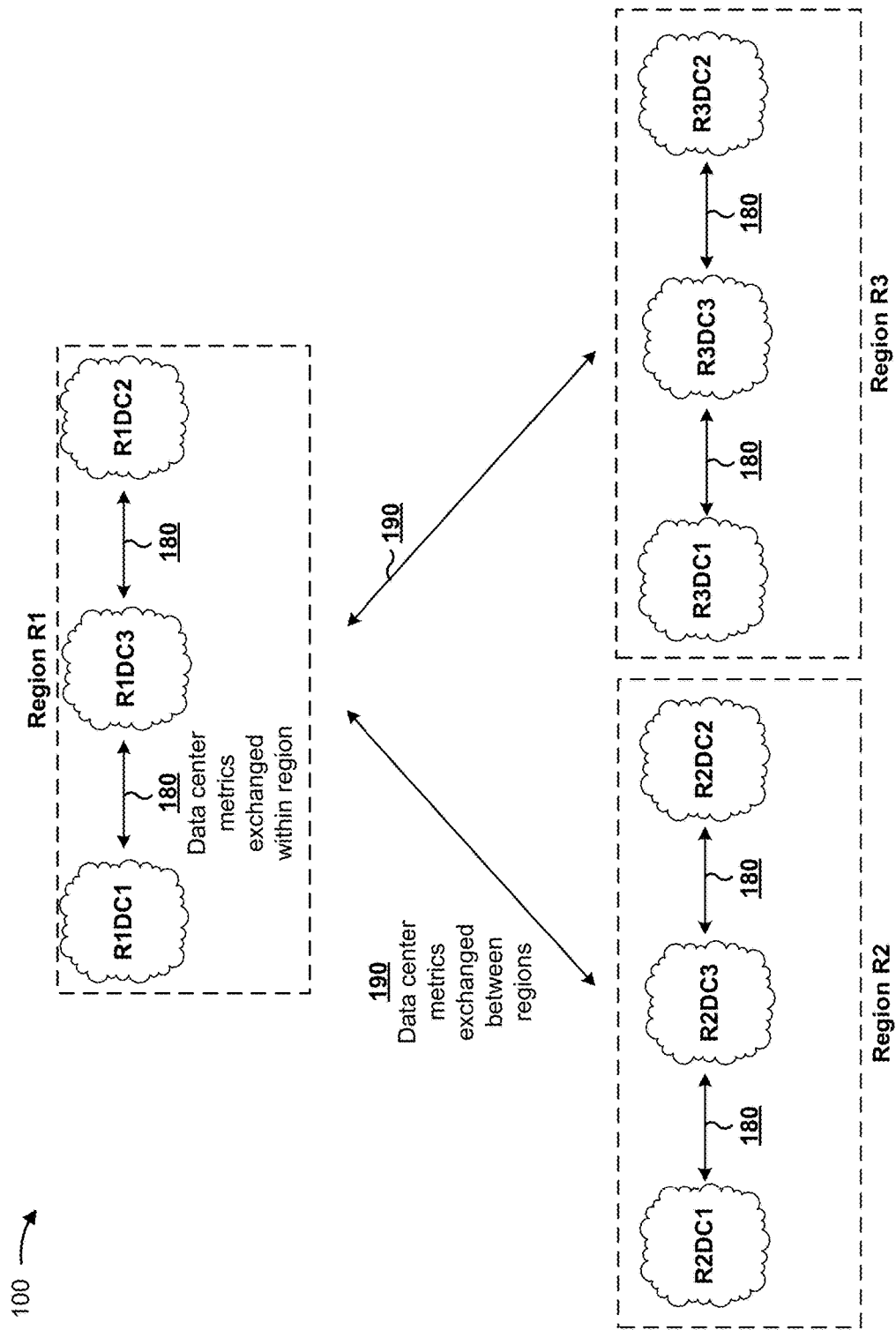

As shown in FIG. 1D, and by reference number 180, an authoritative data center in a region may exchange metrics with other data centers in the region. For example, authoritative data center R1DC3 may exchange metrics with data centers R1DC1 and R1DC2 (e.g., via authoritative load balancing device R1LB3 and load balancing devices R1LB1 and R1LB2). As shown by reference number 190, an authoritative data center in a region may exchange metrics with one or more authoritative data centers in other regions. For example, authoritative data center R1DC3 may exchange metrics for all data centers in region R1 with authoritative data centers R2DC3 and R3DC3 (e.g., via authoritative load balancing devices R1LB3, R2LB3, and R3LB3).

In this way, load balancing devices in a region may use a spanning tree to exchange metrics (e.g., rather than using a mesh network to exchange the metrics). This conserves network resources by reducing and/or eliminating the need for the load balancing devices to exchange metrics with all other load balancing devices in the region, thereby reducing a quantity of transmissions of the metrics among the load balancing devices (e.g., relative to exchanging metrics using a mesh network). In addition, a local authoritative load balancing device may exchange region metrics with remote authoritative load balancing devices using a spanning tree, which conserves network resources by reducing and/or eliminating the need for all load balancing devices in a local region to exchange metrics with all load balancing devices in a remote region (e.g., as would be the case with exchanging metrics using a mesh network).

As indicated above, FIGS. 1A-1D are provided merely as an example. Other examples are possible and may differ from what was described with regard to FIGS. 1A-1D.

Figure 2:
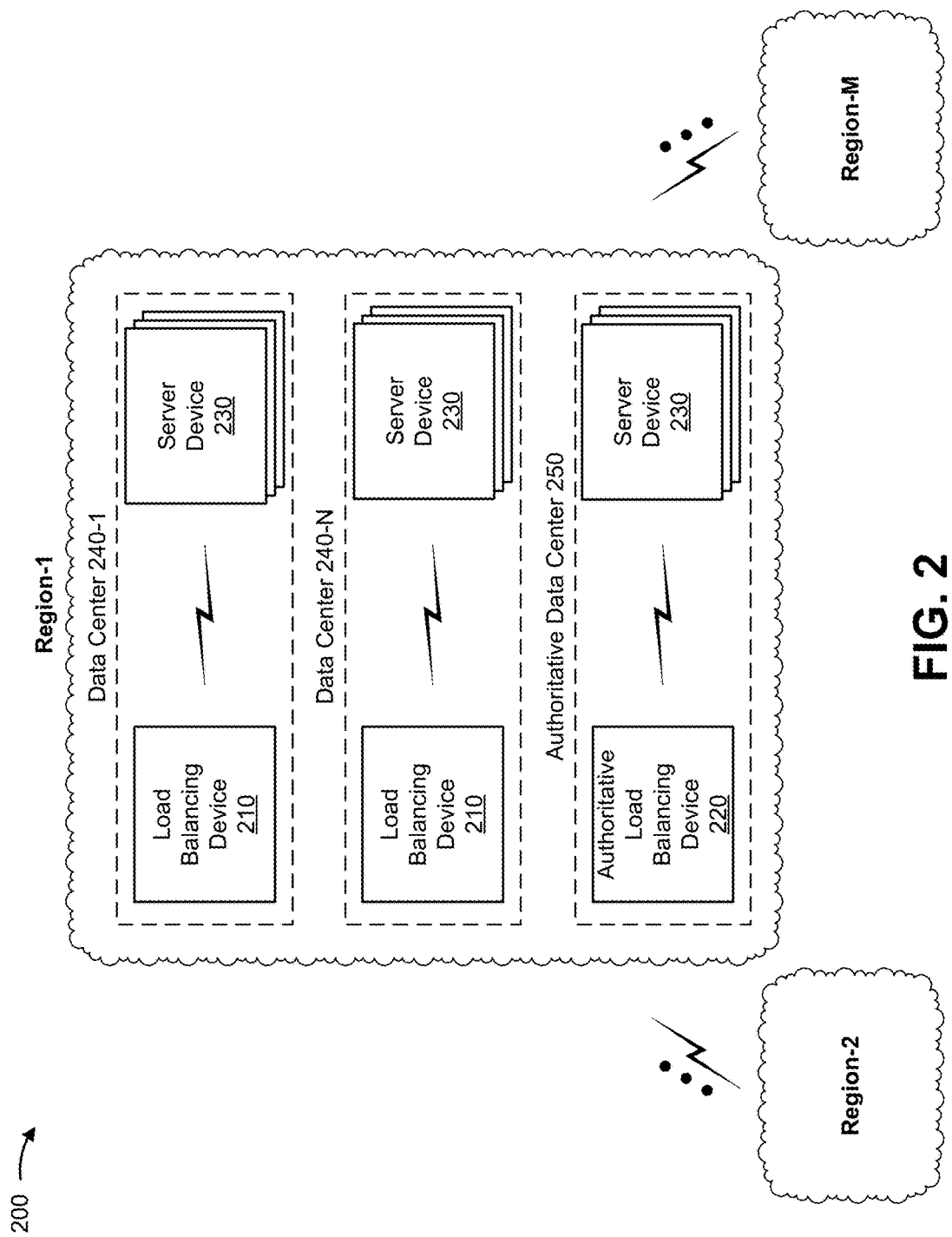
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a load balancing device 210, an authoritative load balancing device 220, one or more server devices 230 (hereinafter referred to collectively as "server devices 230," and individually as "server device 230"), one or more data centers 240-1 through 240-N (N≥1) (hereinafter referred to collectively as "data centers 240," and individually as "data center 240"), and an authoritative data center 250. Devices of environment 200 may interconnect via wired connections, wireless connections, or a combination of wired and wireless connections.

As shown, a set of data center(s) 240 and an authoritative data center 250 may be grouped into a region, such as a geographic area, a continent, or a country (e.g., shown as Region-1 through Region-M (M≥1)). As used herein, the terms "load balancing device" and/or "load balancing devices" may be used to refer to load balancing device 210 and/or authoritative load balancing device 220. In addition, the terms "data center" and/or "data centers" may be used to refer to data center 240 and/or authoritative data center 250.

Load balancing device 210 includes one or more devices capable of distributing workload (e.g., network traffic) among server devices 230. For example, load balancing device 210 may include a load balancer, a router, a server, a gateway, a bridge, a hub, or a switch that facilitates a load balancing service (e.g., a domain name system (DNS) load balancing service). In some implementations, load balancing device 210 may provide metrics (e.g., information associated with the availability of server devices 230 to process network traffic) to and/or receive metrics from authoritative load balancing device 220. In some implementations, load balancing device 210 may use the metrics to balance workload among server devices 230. Workload, as used herein, may refer to network traffic associated with server devices 230, such as a request for usage of a distributed computing resource, such as a processing resource, a transmission resource, or a storage resource. In some implementations, load balancing device 210 may function as authoritative load balancing device 220.

Authoritative load balancing device 220 includes one or more devices capable of distributing workload to server devices 230. For example, authoritative load balancing device 220 may include a load balancer, a router, a server, a gateway, a bridge, a hub, or a switch that facilitates a load balancing service. In some implementations, authoritative load balancing device 220 may provide metrics to and/or receive metrics from load balancing device 210. In some implementations, authoritative load balancing device 220 may provide metrics to and/or receive metrics from a different authoritative load balancing device 220 (e.g., a remote authoritative load balancing device 220 associated with a remote region). In some implementations, authoritative load balancing device 220 may use the metrics to balance workload among server devices 230 and/or among authoritative load balancing devices 220 (e.g., associated with different regions). In some implementations, authoritative load balancing device 220 may function as load balancing device 210.

Server device 230 includes one or more devices capable of storing, processing, and/or routing information. For example, server device 230 may include a server, a computer, a computer cluster, a central processing unit (CPU), a graphical processing unit (GPU), a graphics accelerator processor, a disk drive, a virtual machine, or a memory device. In some implementations, server device 230 may receive information from and/or transmit information to other devices in environment 200 or to endpoint devices (not shown) that request and/or receive information from server device 230. In some implementations, one or more server devices 230 may be associated with data center 240 and/or authoritative data center 250.

Data center 240 includes a load balancing device 210 and a group of server devices 230. Furthermore, data center 240 may include one or more hardware devices associated with routing messages to or from server devices 230, such as a gateway, a router, a switch, a hub, or a bridge. In some implementations, data center 240 may function as authoritative data center 250.

Authoritative data center 250 includes an authoritative load balancing device 220 and a group of server devices 230. Furthermore, authoritative data center 250 may include one or more hardware devices associated with routing messages to or from server devices 230, such as a gateway, a router, a switch, a hub, or a bridge. In some implementations, authoritative data center 250 may function as data center 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
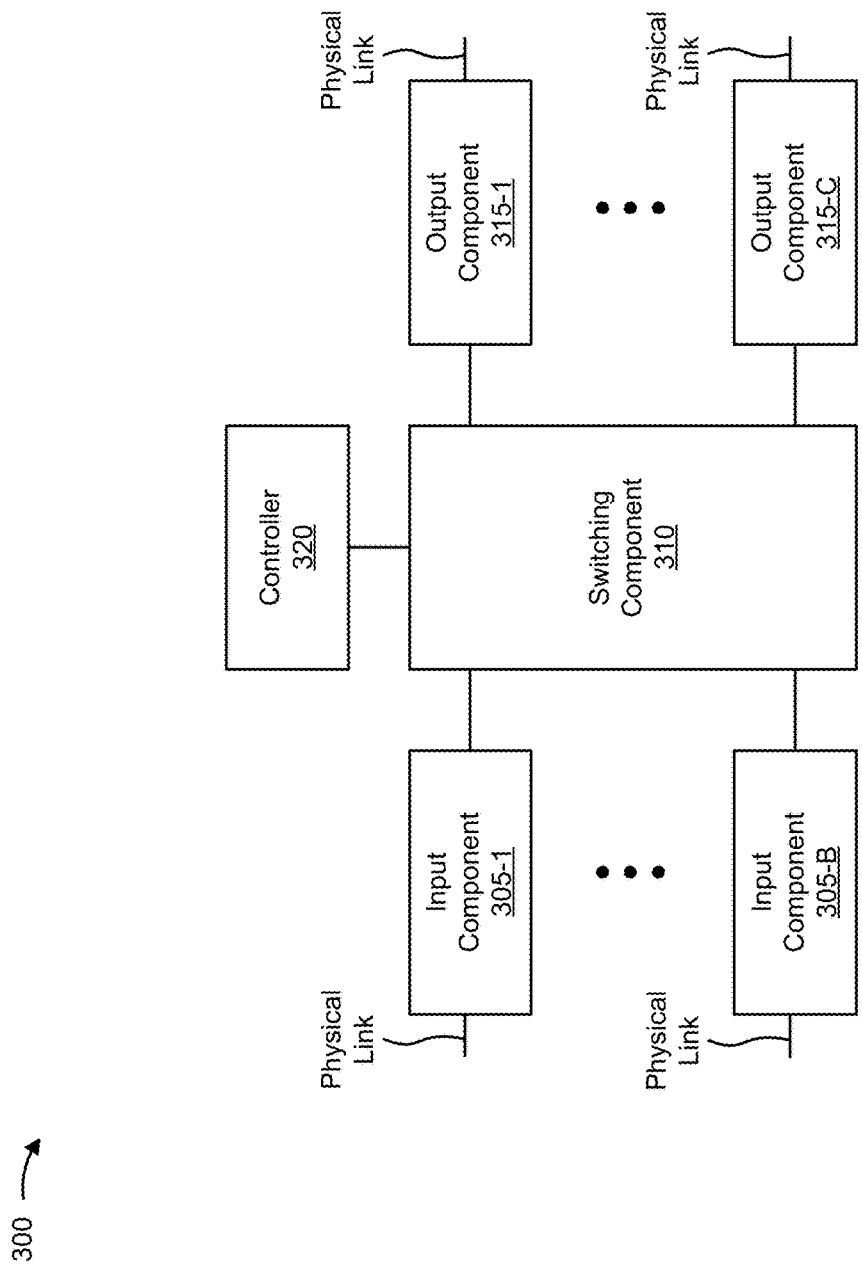
FIGS. 3A and 3B are diagrams of example components of one or more devices of FIG. 2.
Figure 3B:
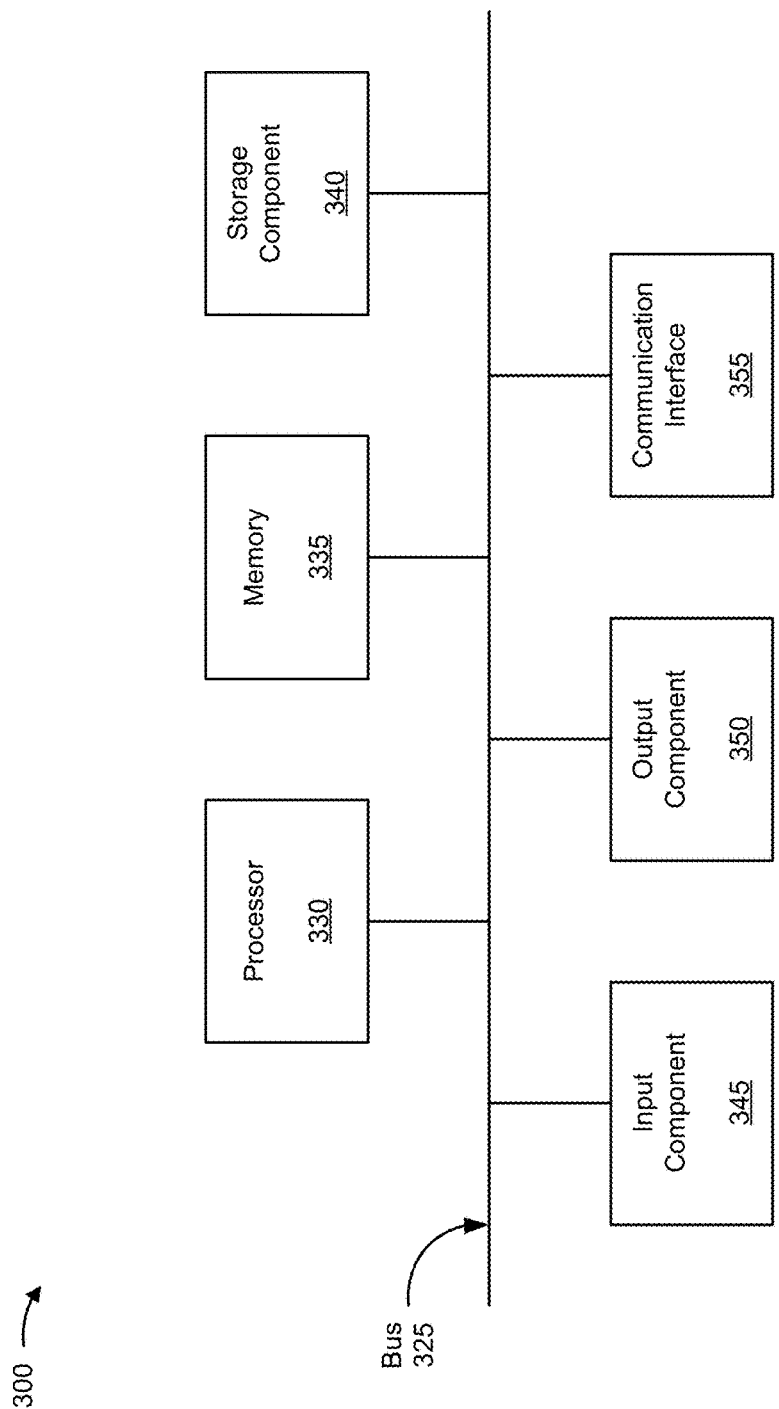

FIGS. 3A and 3B are diagrams of example components of a device 300. Device 300 may correspond to load balancing device 210, authoritative load balancing device 220, and/or server device 230. In some implementations, load balancing device 210, authoritative load balancing device 220, and/or server device 230 may include one or more devices 300 and/or one or more components of device 300.

As shown in FIG. 3A, device 300 may include a set of input components 305-1 through 305-B (B≥1) (referred to individually as "input component 305," and collectively as "input components 305"), a switching component 310, a set of output components 315-1 through 315-C (C≥1) (referred to individually as "output component 315," and collectively as "output components 315"), and a controller 320. Components of device 300 may interconnect via wired connections, wireless connections, or a combination of wired and wireless connections.

Input component 305 is a point of attachment for a physical link connected to device 300, and is a point of entry for incoming traffic (e.g., packets) received by device 300. Input component 305 processes incoming traffic, such as by performing data link layer encapsulation or decapsulation. In some implementations, input component 305 sends and/or receives packets. In some implementations, input component 305 includes an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 is implemented via one or more crossbars, via one or more busses, and/or using shared memory. The shared memory may act as a temporary buffer to store packets from input components 305 before the packets are eventually scheduled for delivery to output components 315. In some implementations, switching component 310 enables input components 305, output components 315, and/or controller 320 to communicate.

Output component 315 is a point of attachment for a physical link connected to device 300, and is a point of exit for outgoing traffic (e.g., packets) transmitted by device 300. Output component 315 stores packets and/or may schedule packets for transmission on output physical links. Output component 315 supports data link layer encapsulation or decapsulation, and/or a variety of higher-level protocols. In some implementations, output component 315 sends packets and/or receives packets. In some implementations, output component 315 includes an output line card that includes one or more packet processing components (e.g., in the form of integrated circuits), such as one or more IFCs, packet forwarding components, line card controller components, output ports, processors, memories, and/or output queues. In some implementations, input component 305 and output component 315 are implemented by the same set of components (i.e., an input/output component are a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 includes one or more processors that can be programmed to perform a function.

In some implementations, controller 320 includes a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 communicates with other devices, networks, and/or systems connected to device 300 to exchange information regarding network topology. Controller 320 creates routing tables based on the network topology information, creates forwarding tables based on the routing tables, and forwards the forwarding tables to input components 305 and/or output components 315. Input components 305 and/or output components 315 use the forwarding tables to perform route lookups for incoming and/or outgoing packets.

Controller 320 performs one or more processes described herein. Controller 320 performs these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

As shown in FIG. 3B, device 300 may include a bus 325, a processor 330, a memory 335, a storage component 340, an input component 345, an output component 350, and a communication interface 355.

Bus 325 includes a component that permits communication among the components of device 300. Processor 330 is implemented in hardware, firmware, or a combination of hardware and software. Processor 330 includes a processor (e.g., a central processing unit (CPU), a graphics processing unit (GPU), or an accelerated processing unit (APU)), a microprocessor, a microcontroller, and/or any processing component (e.g., a field-programmable gate array (FPGA) or an application-specific integrated circuit (ASIC)) that interprets and/or executes instructions. In some implementations, processor 330 includes one or more processors that can be programmed to perform a function. Memory 335 includes a random access memory (RAM), a read only memory (ROM), and/or another type of dynamic or static storage device (e.g., a flash memory, a magnetic memory, or an optical memory) that stores information and/or instructions for use by processor 330.

Storage component 340 stores information and/or software related to the operation and use of device 300. For example, storage component 340 may include a hard disk (e.g., a magnetic disk, an optical disk, a magneto-optic disk, or a solid state disk), a compact disc (CD), a digital versatile disc (DVD), a floppy disk, a cartridge, a magnetic tape, and/or another type of non-transitory computer-readable medium, along with a corresponding drive.

Input component 345 includes a component that permits device 300 to receive information, such as via user input (e.g., a touch screen display, a keyboard, a keypad, a mouse, a button, a switch, or a microphone). Additionally, or alternatively, input component 345 may include a sensor for sensing information (e.g., a global positioning system (GPS) component, an accelerometer, a gyroscope, or an actuator). Output component 350 includes a component that provides output information from device 300 (e.g., a display, a speaker, or one or more light-emitting diodes (LEDs)).

Communication interface 355 includes a transceiver-like component (e.g., a transceiver or a separate receiver and transmitter) that enables device 300 to communicate with other devices, such as via a wired connection, a wireless connection, or a combination of wired and wireless connections. Communication interface 355 may permit device 300 to receive information from another device and/or provide information to another device. For example, communication interface 355 may include an Ethernet interface, an optical interface, a coaxial interface, an infrared interface, a radio frequency (RF) interface, a universal serial bus (USB) interface, a Wi-Fi interface, or a cellular network interface.

Device 300 may perform one or more processes described herein. Device 300 may perform these processes in response to processor 330 executing software instructions stored by a non-transitory computer-readable medium, such as memory 335 and/or storage component 340. A computer-readable medium is defined herein as a non-transitory memory device. A memory device includes memory space within a single physical storage device or memory space spread across multiple physical storage devices.

Software instructions may be read into memory 335 and/or storage component 340 from non-transitory computer-readable medium or from another device via communication interface 355. When executed, software instructions stored in memory 335 and/or storage component 340 may cause processor 330 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIGS. 3A and 3B are provided as an example. In practice, device 300 may include additional components, fewer components, different components, or differently arranged components than those shown in FIGS. 3A and 3B. Additionally, or alternatively, a set of components (e.g., one or more components) of device 300 may perform one or more functions described as being performed by another set of components of device 300.

Figure 4:
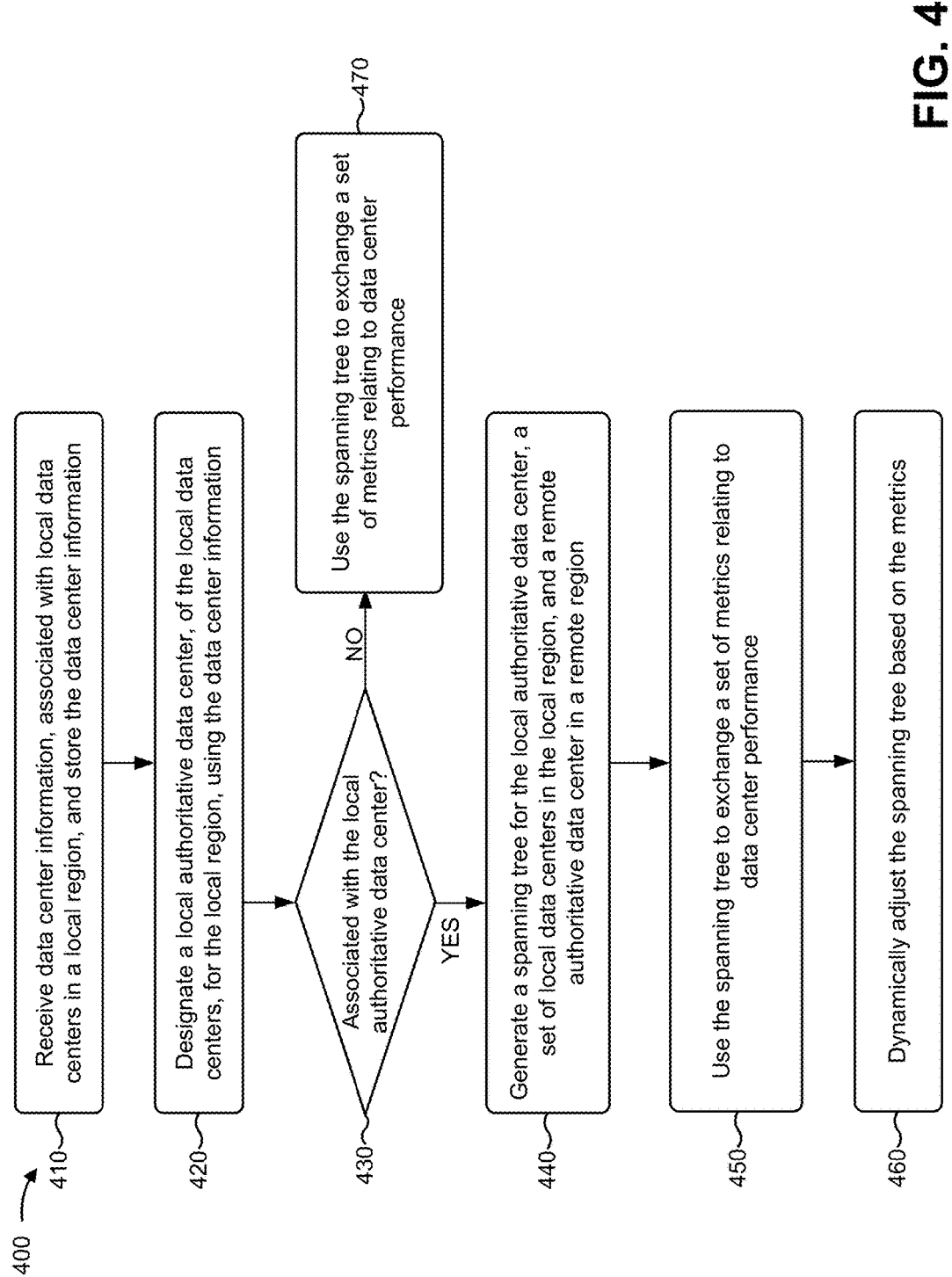
FIG. 4 is a flow chart of an example process for using a spanning tree to exchange metrics relating to data center performance.

FIG. 4 is a flow chart of an example process 400 for using a spanning tree to exchange metrics relating to data center performance. In some implementations, one or more process blocks of FIG. 4 may be performed by a load balancing device (e.g., load balancing device 210 and/or authoritative load balancing device 220). In some implementations, one or more process blocks of FIG. 4 may be performed by another device or a group of devices separate from or including the load balancing device, such as server device 230.

As shown in FIG. 4, process 400 may include receiving data center information, associated with local data centers in a local region, and storing the data center information (block 410). For example, load balancing device 210 may receive data center information that includes data center identifiers (e.g., a value, such as a number or a string) that identify data centers 240 in a region (e.g., a geographic area, such as a continent, a country, a range of global positioning system coordinates, or a range of latitude and longitude coordinates). In some implementations, a data center identifier may include a network address (e.g., a virtual IP address or an IP address) that corresponds to a data center 240. Additionally, or alternatively, the data center information may include a region identifier that identifies the region in which data centers 240 are located (e.g., a local region), a location identifier that identifies a location of data centers 240 (e.g., a city), and/or information that identifies a quantity of data centers 240 in the region.

In some implementations, load balancing device 210 may receive the data center information based on input provided by an administrator and/or from another load balancing device 210 in the region. In some implementations, load balancing device 210 may provide the data center information to and/or receive the data center information from other load balancing devices 210 in the region. In some implementations, load balancing devices 210 may exchange the data center information so that all load balancing devices 210 in the region can store the data center information. In some implementations, load balancing device(s) 210 may store the data center information, and may use the data center information to designate an authoritative load balancing device 220 and/or an authoritative data center 250, as described below.

As further shown in FIG. 4, process 400 may include designating a local authoritative data center, of the local data centers, for the local region, using the data center information (block 420). For example, load balancing devices 210 in a local region may use the data center information to designate a local authoritative data center 250 for the local region. In some implementations, load balancing devices 210 may designate the local authoritative data center 250 based on network addresses of the local data centers 240 using one or more techniques. For example, load balancing devices 210 may designate the local authoritative data center 250 by selecting the local data center 240 with the lowest network address or the highest network address relative to the network addresses of other local data centers 240 in the local region. This conserves processor resources of load balancing devices 210 when designating local authoritative data center 250 by quickly and efficiently designating local authoritative data center 250.

In some implementations, load balancing devices 210 may designate the local authoritative data center 250 based a geographic proximity of the local data centers 240 to a remote data center 240 in a remote region (e.g., a region different from the local region). For example, load balancing devices 210 may determine the local authoritative data center 250 by selecting the local data center 240 with the closest geographic proximity to a remote data center 240 in a remote region (e.g., relative to other local data centers 240), which may reduce latency when providing and/or receiving metrics to the remote region, as described below.

In some implementations, load balancing devices 210 may designate the local authoritative data center 250 based on which load balancing device 210 was the first load balancing device 210 to configure as a local authoritative load balancing device 220. In some implementations, load balancing devices 210 may designate local authoritative data center 250 based on which local data center 240 has the fewest number of server devices 230 (e.g., relative to other local data centers 240), thereby enabling the local data center 240 with the fewest number of server devices 230 to balance workload. In some implementations, load balancing devices 210 may designate the local authoritative data center 250 by selecting a local data center 240 at random.

In some implementations, load balancing devices 210 may designate local authoritative data center 250 based on a combination of multiple techniques. In some implementations, load balancing devices 210 may designate local authoritative data center 250 based on weighting one or more factors. For example, load balancing devices 210 may weight the geographic proximity of the local data centers 240 as the most important factor (e.g., relative to other factors), the number of server devices 230 included in data centers 240 as the second most important factor, and so on. In some implementations, load balancing devices 210 in a remote region (e.g., remote load balancing devices 210) may determine a remote authoritative data center 250, of the remote data centers 240 in the remote region, for the remote region.

In some implementations, a single local load balancing device 210 may designate a local load balancing device 210 as a local authoritative load balancing device 220 and provide the designation to all other local load balancing devices 210 in the local region. Additionally, or alternatively, all local load balancing devices 210 in the local region may designate a local load balancing device 210 as a local authoritative load balancing device 220. In some implementations, the local load balancing devices 210 may store the designation and verify with the other local load balancing devices 210 that all local load balancing devices 210 have designated the same local load balancing device 210 as the local authoritative load balancing device 220

(e.g., by exchanging information including the designated local authoritative load balancing device 220).

In some implementations, when the local authoritative data center 250 includes multiple local load balancing device 210, the multiple local load balancing devices 210 may designate one local load balancing device 210 as a local authoritative load balancing device 220 using one or more techniques similar to the techniques described above. For example, the multiple load balancing devices 210 may designate one of the multiple local load balancing devices 210 as the local authoritative load balancing device 220 based on a network address of the multiple local load balancing devices 210. As another example, the multiple local load balancing devices 210 may designate the local authoritative load balancing device 220 based on a geographic proximity of the multiple local load balancing devices 210 and other local load balancing devices 210.

As a further example, the multiple local load balancing devices 210 may designate the local authoritative load balancing device 220 based on a random selection of one of the multiple local load balancing devices 210. As a final example, the multiple local load balancing devices 210 may designate the local authoritative load balancing device 220 by using a combination of multiple techniques.

As further shown in FIG. 4, process 400 may include determining whether a load balancing device is associated with the local authoritative data center (block 430). For example, load balancing device 210, included in local authoritative data center 250, may be designated as a local authoritative load balancing device 220. On the other hand, a load balancing device 210, that is not included in the local authoritative data center 250, may be designated as a local load balancing device 210 (e.g., rather than a local authoritative load balancing device 220) based on being associated with a local data center 240 other than the local authoritative data center 250.

As further shown in FIG. 4, if the load balancing device is associated with the local authoritative data center (block 430—YES), then process 400 may include generating a spanning tree for the local authoritative data center, a set of local data centers in the local region, and a remote authoritative data center in a remote region (block 440). For example, the local authoritative load balancing device 220 may identify all local load balancing devices 210, associated with the local data centers 240, as spanning tree nodes for the spanning tree in the local region. In some implementations, authoritative load balancing device 220 may identify load balancing devices 210 in a region based on stored information that includes load balancing devices 210 in the region (e.g., information input by an administrator). Additionally, or alternatively, authoritative load balancing device 220 may identify load balancing devices 210 in a region based on exchanging region information that identifies the region of load balancing devices 210 with load balancing devices 210.

In some implementations, the local authoritative load balancing device 220 may generate spanning tree connections among the identified spanning tree nodes (e.g., among the local load balancing devices), thereby generating the spanning tree among the local data centers 240 and the local authoritative data center 250. In this way, local load balancing devices 210 may exchange metrics with a local authoritative load balancing device 220 without exchanging the metrics with all other local load balancing devices 210 (e.g., as would be the case when using a mesh network to exchange the metrics).

In some implementations, a remote authoritative load balancing device 220 may identify all remote load balancing devices 210, associated with remote data centers 240 in a remote region, as spanning tree nodes for the spanning tree in the remote region. In some implementations, the remote authoritative load balancing device 220 may generate spanning tree connections among the identified spanning tree nodes in the remote region (e.g., among the remote load balancing devices 210), thereby generating the spanning tree for the remote data centers 240 and the remote authoritative data center 250. In this way, remote load balancing devices 210 may exchange metrics with a remote authoritative load balancing device 220 without exchanging the metrics with all other remote load balancing devices 210 (e.g., as would be the case when using a mesh network to exchange the metrics).

In some implementations, the local authoritative load balancing device 220 may identify remote authoritative load balancing devices 220 as spanning tree nodes for a spanning tree among the local region and remote regions. In some implementations, the local authoritative load balancing device 220 and the remote authoritative load balancing devices 220 may generate spanning tree connections among the local authoritative load balancing device 220 and the remote authoritative load balancing devices 220, thereby generating the spanning tree between the local region and the remote region (e.g., for the local authoritative data center 250 and the remote authoritative data center 250). In this way, a local authoritative load balancing device 220 may exchange metrics with remote authoritative load balancing devices 220 without exchanging the metrics with all remote load balancing devices 210 (e.g., as would be the case when using a mesh network to exchange the metrics).

In some implementations, authoritative load balancing devices 220 (e.g., local authoritative load balancing device 220 and/or remote authoritative load balancing devices 220) may generate the spanning trees using a spanning tree protocol (e.g., a rapid spanning tree protocol or a multiple spanning tree protocol). In some implementations, authoritative load balancing devices 220 may formulate the spanning tree based on a geographic proximity of load balancing devices 210. For example, authoritative load balancing devices 220 may formulate spanning tree connections that minimize the average geographic distance between load balancing devices 210 within a region and/or between authoritative load balancing devices 220 of multiple regions, which may reduce latency between load balancing devices 210 in the region and/or between authoritative load balancing devices 220 of the multiple regions. As another example, authoritative load balancing devices 220 may formulate the spanning tree based on the least static proximity distance between load balancing devices 210 and/or data centers 240/250.

In some implementations, authoritative load balancing devices 220 may generate spanning trees that have fewer active paths (e.g., a set of connections between two nodes) relative to a mesh network. Additionally, or alternatively, authoritative load balancing devices 220 may generate spanning trees where there is a single active path between any two nodes (e.g., a loop-free spanning tree). Additionally, or alternatively, authoritative load balancing devices 220 may generate spanning trees where load balancing devices 210 and/or authoritative load balancing devices 220 provide metrics to, at most, two other load balancing devices 210 and/or authoritative load balancing devices 220. Additionally, or alternatively, authoritative load balancing devices 220 may generate spanning trees that have, for example, a hub-and-spoke network topology, which conserves network resources by having a local authoritative load balancing device 220 exchange metrics directly with all local load balancing devices 210 in the local region and/or with remote authoritative load balancing devices 220.

In some implementations, the load balancing devices may store a destination (e.g., a destination address or a destination port) to which the load balancing devices 220 are to provide metrics via the spanning tree. For example, a local load balancing device 210 may store the destinations of other local load balancing devices 210 and/or a local authoritative load balancing device 220, to which the local load balancing device 210 is to provide the metrics. As another example, a local authoritative load balancing device 220 may store the destinations of the local load balancing devices 210 and/or remote authoritative load balancing devices 220, to which the local authoritative load balancing device 220 is to provide the metrics.

In some implementations, a single local authoritative load balancing device 220 may generate the spanning tree among the remote regions and provide the spanning tree to remote authoritative load balancing devices 220. Additionally, or alternatively, all authoritative load balancing devices 220 (e.g., local and remote) may generate the spanning tree. In some implementations, the authoritative load balancing devices 220 may store the spanning tree and verify with the other authoritative load balancing devices 220 that all authoritative load balancing devices 220 have generated the same spanning tree (e.g., by exchanging information that includes the spanning tree and comparing the information received from the other authoritative load balancing devices 220 to the stored spanning tree).

As further shown in FIG. 4, process 400 may include using the spanning tree to exchange a set of metrics relating to data center performance (block 450). For example, local authoritative load balancing device 220 may receive metrics relating to local data center performance from local load balancing devices 210, and/or may provide the metrics to local load balancing devices 210. Additionally, or alternatively, authoritative load balancing device 220 may receive remote metrics relating to the performance of a remote data center 240 and/or a remote authoritative data center 250 from remote authoritative load balancing devices 220. In some implementations, authoritative load balancing device 220 may provide local metrics relating to the performance of a local data center 240 and/or a local authoritative data center 250 to one or more remote authoritative load balancing devices 220.

In some implementations, the metrics may include availability information relating to an availability of one or more data centers 240 in a region. For example, the availability metrics may include metrics relating to workload for the one or more data centers 240, a quantity of devices (e.g., user devices, such as computers or smart phones) communicating with the one or more data centers 240, whether the one or more data centers 240 are available or unavailable (e.g., up or down). In this way, authoritative load balancing device 220 may avoid assigning workload to an unavailable data center 240, which conserves computing resources of authoritative load balancing device 220 and network resources by preventing authoritative load balancing device 220 from attempting to assign workload to an unavailable data center 240.

Additionally, or alternatively, the metrics may include stickiness information. In some implementations, stickiness information may include a user identifier and/or a user device identifier, such as a network address corresponding to a particular user device, and an associated data center identifier, such as a network address corresponding to a particular data center 240. In some implementations, authoritative load balancing device 220 may use the stickiness information to send a DNS request from the particular user device to a particular data center 240, such as when the particular data center 240 hosts data for a particular user associated with the user device. In this way, authoritative load balancing device 220 may automatically direct a DNS request to a particular data center 240, which conserves computing and/or processor resources of authoritative load balancing device 220 by reducing the need for authoritative load balancing device 220 to determine the workload for the particular data center 240.

Additionally, or alternatively, the metrics may include dynamic proximity information, such as information related to latency associated with a request (e.g., a DNS request) from a particular user device to one or more data centers 240. For example, load balancing devices 210 may use the dynamic proximity information to send a particular request to a first data center 240 (e.g., rather than to a second data center 240) based on the dynamic proximity information indicating that the latency associated with the particular request and the first data center 240 is less than the latency associated with the particular request and a second data center 240. In this way, authoritative load balancing device 220 improves network performance by reducing latency associated with the particular request.

In some implementations, local authoritative load balancing device 220 may use the metrics to balance workload (e.g., requests for resources, such as DNS requests) among local data centers 240 in the local region and among remote authoritative data centers 250 in remote regions, which may in turn balance workload among remote data centers 240 in the remote regions. This may permit scaling of the number of data centers 240 participating in load balancing by having authoritative load balancing devices 220 balance workload (e.g., rather than having all load balancing devices 210 balance workload), which reduces the number of exchanges of metrics between authoritative load balancing device 220 and load balancing devices 210. In some implementations, authoritative load balancing device 220 may use metric and/or non-metric load balancing techniques, such as server-side load balancing, client-side load balancing, or round-robin DNS load balancing to balance the workload.

In some implementations, a local authoritative load balancing device 220 may balance the workload using round-robin DNS on a per region basis (e.g., rather than balancing the workload across all regions). For example, assume that the local authoritative load balancing device 220 is associated with a first region and that the first region includes local data centers 240-1 and 240-2 and local authoritative data center 250. In this case, the local authoritative load balancing device 220 may balance the workload using round-robin DNS, where DNS requests are assigned one-at-a-time to local data centers 240-1 and 240-2 and/or the local authoritative data center 250 included in the first region. For example, the local authoritative load balancing device 220 may assign a first DNS request to the local data center 240-1, a second DNS request to the local data center 240-2, a third DNS request to the local authoritative data center 250, a fourth DNS request to the local data center 240-1, and so forth. This conserves network resources because the local authoritative load balancing device 220 may perform this technique for balancing the workload without exchanging metrics.

In some implementations, a local authoritative load balancing device 220 may monitor and exchange health information relating to local data center health with the local load balancing devices 210. Additionally, or alternatively, the local authoritative load balancing device 220 may receive remote health information relating to the health of a remote data center 240 and/or a remote authoritative data center 250 from remote authoritative load balancing devices 220. In some implementations, the local authoritative load balancing device 220 may provide local health information relating to the health of local data centers 240 and/or a local authoritative data center 250 to one or more remote authoritative load balancing devices 220.

In some implementations, a local authoritative load balancing device 220 may receive health information by sending a message to data centers 240 and/or a remote authoritative data center 250 and receiving a response that includes the health information. In some implementations, the health information may include metrics, such as availability metrics, and/or information different from the metrics. For example, the health information may include information such as a temperature of data centers 240 and/or authoritative data centers 250, a power consumption of data centers 240 and/or authoritative data centers 250, and/or a software version of data centers 240 and/or authoritative data centers 250. This may enable the local authoritative load balancing devices 220 to improve non-metric performance of data centers 240 and/or authoritative data centers 250 by monitoring, exchanging, and using the health information.

In this way, a local authoritative load balancing device 220 may exchange metrics with local load balancing devices 210 using a spanning tree. This conserves network resources by preventing the local load balancing devices 210 from exchanging metrics with all other local load balancing devices 210 in a region (e.g., as would be the case when using a mesh network to exchange metrics). In addition, the local authoritative load balancing device 220 may exchange metrics with a remote authoritative load balancing device 220 using a spanning tree. This conserves network resources and computing resources of the local authoritative load balancing device 220 by preventing the local authoritative load balancing device 220 from exchanging metrics with all remote authoritative load balancing devices 220 (e.g., as would be the case when using a mesh network to exchange metrics).

As further shown in FIG. 4, process 400 may include dynamically adjusting the spanning tree based on the metrics (block 460). For example, authoritative load balancing device 220 may determine that the metrics indicate a change in availability of local data centers 240 and/or remote authoritative data centers 250. In some implementations, the change in availability may indicate that a previously unavailable local data center 240 and/or a previously unavailable remote authoritative data center 250 is available. Alternatively, the change in availability may indicate that a previously available local data center 240 and/or a previously available remote authoritative data center 250 is unavailable.

In some implementations, when a local authoritative load balancing device 220 determines that the metrics indicate a change in availability of local data centers 240 and/or remote authoritative data centers 250, the local authoritative load balancing device 220 may re-generate the spanning tree (e.g., in a similar manner as described above in connection with block 440). In this way, network resources are conserved by preventing local authoritative load balancing device 220 from attempting to provide metrics to unavailable local data centers 240 and/or unavailable remote authoritative data centers 250.

As further shown in FIG. 4, if the load balancing device is not associated with the local authoritative data center (block 430—NO), then process 400 may include using the spanning tree to exchange a set of metrics relating to data center performance (block 470). For example, load balancing device 210, may not be included in a local authoritative data center 250 in a local region, and thus may be designated as a local load balancing device 210 (e.g., rather than as a local authoritative load balancing device 220). In this case, local load balancing device 210 may exchange metrics relating to the performance of local data center 240 with local authoritative data center 250 (e.g., rather than exchanging the metrics with all local data centers 240 in a region) using the spanning tree. In some implementations, local load balancing device 210 may receive metrics relating to the performance of other local data centers 240, remote data centers 240, local authoritative data center 250, or remote authoritative data centers 250 from local authoritative data center 250. Using the spanning tree to exchange metrics conserves network resources by having fewer transmissions of metrics (e.g., relative to exchanging metrics via a mesh network).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable load balancing devices to exchange metrics (e.g., in and/or among regions) using a spanning tree. This may reduce and/or eliminate the need for the load balancing devices to exchange metrics using a mesh network, which conserves network resources by reducing and/or eliminating the need for all load balancing devices to exchange metrics with all other load balancing devices (e.g., as would be the case when exchanging metrics using a mesh network).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A load balancing device, comprising:
   one or more processors to:
      receive first information associated with a plurality of local data centers included in a local region with the load balancing device;
      designate a local authoritative data center, of the plurality of local data centers, based on the first information,
         the local authoritative data center being designated based upon one or more factors including at least one of:
            information relating to a local data center with a lowest network address of network addresses associated with the plurality of local data centers,
            information relating to a local data center with a highest network address of the network addresses of the plurality of local data centers,
            information relating to a local data center with a minimum number of servers, or
            information relating a local data center with a closest geographical proximity to a remote data center,
         the load balancing device being included in the local authoritative data center and being authoritative, and
         the load balancing device communicating with one or more local load balancing devices within the local region;
      receive second information associated with a plurality of remote data centers included in a plurality of remote regions separate from the local region,
         each remote region, of the plurality of remote regions, having an authoritative data center and an authoritative load balancing device;
      generate, based on one or more geographic proximities between the local region and the plurality of remote regions, a spanning tree based on the first information and the second information,
         the spanning tree indicating a manner in which the load balancing device and a plurality of other authoritative load balancing devices of the plurality of remote regions are to communicate to exchange third information associated with the plurality of local data centers and the plurality of remote data centers; and
      exchange the third information with one or more remote load balancing devices, included in one or more remote data centers of the plurality of remote data centers, based on the spanning tree.

2. The load balancing device of claim 1, where the one or more processors, when generating the spanning tree, are to:
   generate the spanning tree based on determining that the load balancing device is included in the local authoritative data center.

3. The load balancing device of claim 1, where the spanning tree includes fewer active paths, among the plurality of local data centers and the plurality of remote data centers, than if a mesh network were to be established among the plurality of local data centers and the plurality of remote data centers.

4. The load balancing device of claim 1, where the spanning tree includes:
   a first single active path between any two local data centers of the plurality of local data centers,
   a second single active path between any two remote data centers of the plurality of remote data centers, and
   a third single active path between any local data center, of the plurality of local data centers, and any remote data center of the plurality of remote data centers.

5. The load balancing device of claim 1, where the one or more processors are further to:
   exchange the third information with one or more local load balancing devices, included in one or more local data centers of the plurality of local data centers, based on the spanning tree.

6. The load balancing device of claim 1, where the one or more processors, when exchanging the third information, are to:
   exchange the third information directly with, at most, two remote load balancing devices included in the plurality of remote data centers.

7. The load balancing device of claim 1, where the third information includes:
   one or more metrics associated with data center performance.

8. A non-transitory computer-readable medium storing instructions, the instructions comprising:
   one or more instructions that, when executed by one or more processors, cause the one or more processors to:
      receive local data center information associated with multiple local data centers,
         the multiple local data centers being located in a local geographic area, and
         the multiple local data centers including multiple local load balancing devices;
      designate a local authoritative data center, of the multiple local data centers, based on the local data center information,
         the local authoritative data center being designated based upon one or more factors including at least one of:
            information relating to a local data center with a lowest network address of network addresses associated with the multiple local data centers,
            information relating to a local data center with a highest network address of the network addresses of the multiple local data centers,
            information relating to a local data center with a minimum number of servers, or
            information relating a local data center with a closest geographical proximity to a remote data center, a load balancing device, of the multiple local load balancing devices, being included in the local authoritative data center and being authoritative, and the load balancing device communicating with one or more local load balancing devices within the local geographic area, receive remote data center information associated with multiple remote data centers, the multiple remote data centers being located in a remote geographic area that is different from the local geographic area, the multiple remote data centers including multiple remote load balancing devices, and the remote geographic area having an authoritative data center and a local authoritative load balancing device;

generate a spanning tree based on the local data center information and the remote data center information, the spanning tree indicating a manner in which the local authoritative load balancing device, of the multiple local load balancing devices, and the local authoritative load balancing device, of the multiple remote load balancing devices, are to exchange metrics associated with the multiple local data centers or the multiple remote data centers; and exchange the metrics with the local authoritative load balancing device of the multiple remote load balancing devices or the one or more local load balancing devices based on the spanning tree.

9. The non-transitory computer-readable medium of claim 8, where the one or more instructions, when executed by the one or more processors, further cause the one or more processors to:

detect a change in availability of at least one data center of the multiple local data centers or the multiple remote data centers; and adjust the spanning tree based on detecting the change in availability.

10. The non-transitory computer-readable medium of claim 8, where the spanning tree includes:

a first spanning tree between the local authoritative load balancing device and the one or more local load balancing devices that is not a fully connected mesh network.

11. The non-transitory computer-readable medium of claim 8, where the spanning tree includes:

a first spanning tree that permits the multiple local load balancing devices to exchange the metrics with, at most, two other local load balancing devices of the multiple local load balancing devices, or a second spanning tree that permits the local authoritative load balancing device to exchange the metrics with, at most, two remote load balancing devices of the multiple remote load balancing devices.

12. The non-transitory computer-readable medium of claim 8, where the spanning tree includes:

a first spanning tree that indicates, at most, one active path between any two local load balancing devices of the multiple local load balancing devices, or a second spanning tree that indicates, at most, one active path between the local authoritative load balancing device and the multiple remote load balancing devices.

13. The non-transitory computer-readable medium of claim 8, where the local data center information includes:

a quantity of the multiple local data centers in the local geographic area, multiple local data center identifiers that identify the multiple local data centers, multiple local location identifiers that identify multiple geographic locations of the multiple local data centers, or a local geographic identifier that identifies the local geographic area.

14. The non-transitory computer-readable medium of claim 8, where the remote data center information includes:

a quantity of the multiple remote data centers in the remote geographic area, multiple remote data center identifiers that identify the multiple remote data centers, multiple remote location identifiers that identify multiple geographic locations of the multiple remote data centers, or a remote geographic identifier that identifies the remote geographic area.

15. A method, comprising:

receiving, by a device, first data center information, the first data center information being associated with first data centers in a first region;

designating, by the device, a first authoritative data center, of the first data centers, based on the first data center information, the first authoritative data center being designated based upon one or more factors including at least one of:

information relating to a local data center with a lowest network address of network addresses associated with the first data centers, information relating to a local data center with a highest network address of the network addresses of the first data centers, information relating to a local data center with a minimum number of servers, or information relating a local data center with a closest geographical proximity to a second data center, the device being included in the first authoritative data center and being authoritative, and the device communicating with one or more load balancing devices within the first region;

receiving, by the device, second data center information, the second data center information being associated with second data centers in a second region, the second region having an authoritative data center and second authoritative load balancing device, the first region and the second region being different;

generating, by the device, a spanning tree based on the first data center information and the second data center information, the spanning tree being associated with exchanging metrics associated with the first data centers and the second data centers, the spanning tree being used to exchange the metrics between the device and other devices included in the first data centers or the second authoritative load balancing device included in the second data centers; and exchanging, by the device, the metrics with the other devices or the second authoritative load balancing device based on the spanning tree.

16. The method of claim 15, where generating the spanning tree comprises:

determining that the device has been designated as an authoritative device responsible for generating the spanning tree; and generating the spanning tree based on determining that the device has been designated as the authoritative device.

17. The method of claim 15, where exchanging the metrics comprises:

exchanging the metrics with one or more first devices associated with the first data centers, or exchanging the metrics with one or more second devices associated with the second data centers.

18. The method of claim 15, further comprising:

receiving updated metrics,
the updated metrics including an updated availability of the first data centers or the second data centers; and adjusting the spanning tree based on the updated metrics.

19. The method of claim 15, further comprising:

allocating workload among the first data centers and the second data centers using the spanning tree.

20. The method of claim 15, where the device is a load balancing device associated with the first data centers in the first region.

* * * * *